May 3, 1927. 1,627,147
D. M. CLARK
COFFEE URN ATTACHMENT TO AUTOMATICALLY MEASURE MORE THAN ONE
SUBSTANCE SIMULTANEOUSLY TO DELIVER A COMBINED UNIFORM VOLUME
Filed March 9, 1926 2 Sheets-Sheet 1
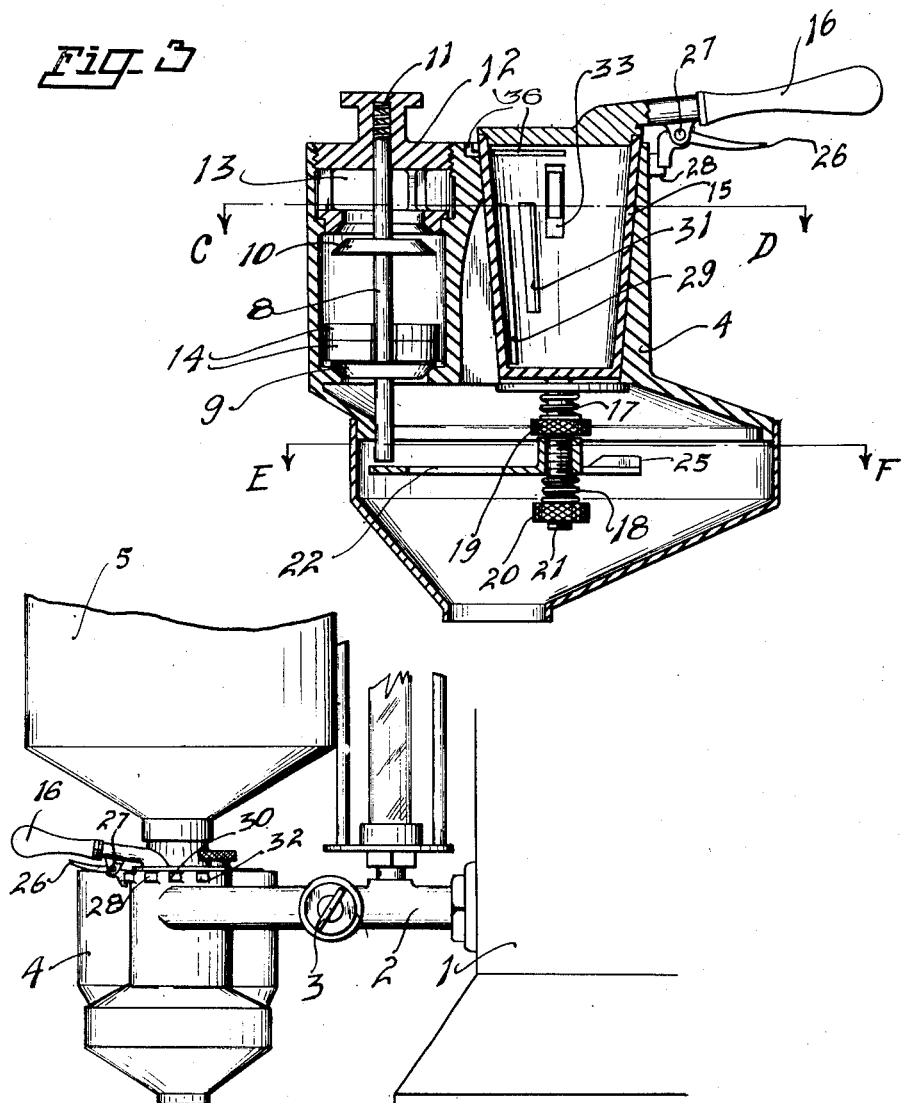

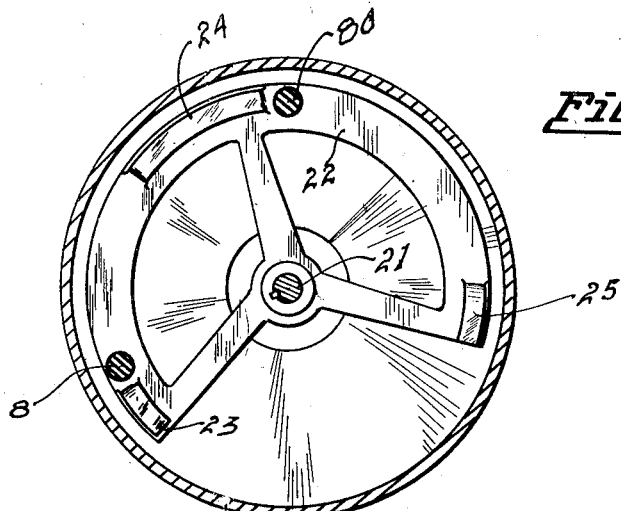
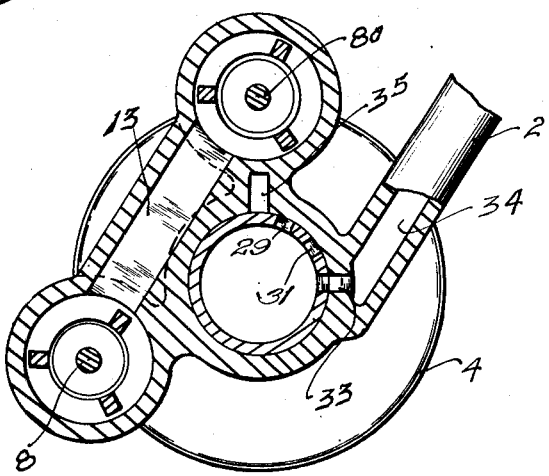
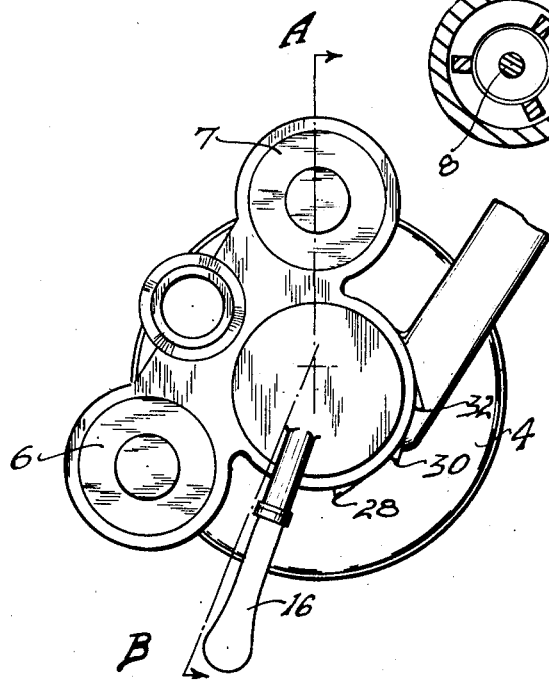

Patented May 3, 1927.

1,627,147

UNITED STATES PATENT OFFICE.

DOLPH M. CLARK, OF PORTLAND, OREGON.

COFFEE-URN ATTACHMENT TO AUTOMATICALLY MEASURE MORE THAN ONE SUBSTANCE SIMULTANEOUSLY TO DELIVER A COMBINED UNIFORM VOLUME.

Application filed March 9, 1926. Serial No. 93,455.

The object of my present invention, consists in means for the automatic dispensing of a predetermined amount of liquid coffee, or a predetermined amount of coffee tempered with a cream content, the total volume of the coffee tempered with the cream to be the same as that of the black coffee, or the serving of a like amount in volume of half coffee and half cream the combined volume of which is equal to the volume of the black coffee, or that of the coffee tempered with the cream content.

Further objects of my present invention, consist in providing a means for the dispensing of cream only from the same container.

Still further objects of my invention, consist in providing a simple and efficient dispensing mechanism wherein but one dispensing lever is required and wherein an efficient mechanism is provided consisting of but few parts and wherein the several parts may be easily cleaned and maintained in a highly sanitary condition.

Additional objects consist in providing means whereby the volumetric contents of the cream dispensing containers may be easily changed.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification:

Fig. 1 is a side elevation of the device shown in position upon a coffee urn of the usual type as used in coffee houses, restaurants, and any and all eating places where coffee as a beverage is served in commercial quantities.

Fig. 2 is a plan view of the device shown in Fig. 1.

Fig. 3 is a cross section view, taken on line A—B of Fig. 2, looking in the direction indicated.

Fig. 4 is a cross section view, taken on line C—D of Fig. 3, looking in the direction indicated.

Fig. 5 is a cross section view, taken on line E—F of Fig. 3, looking in the direction indicated.

Like reference characters refer to like parts throughout the several views.

The coffee urn is shown at 1, having a piping connection 2, leading therefrom. A valve 3 is disposed within the piping outlet connection for the purpose of shutting off the flow of coffee from the urn when it is found desirable to remove the measuring device from the piping connection for any purpose. A valve frame 4, is provided for the reception of the cylinders or measuring compartments and the maintaining of the valves therein, through which the various liquids pass that are to be measured and dispensed. The object being the dispensing of a uniform volume of liquid irrespective of the mixture content of the same. Disposed above the valve frame 4 is a cream container 5. Two measuring and dispensing compartments, in the form of cylinders 6 and 7, are disposed within the main valve frame 4, and having disposed therein valved mechanism adapted to manual manipulation. The valve stem 8 has disposed thereupon valves 9 and 10, the object of the valves being to control the inflow and outflow of the materials to be measured within the cylinder compartments. The valve stem 8 is maintained in alignment and position within suitable guideways disposed within the valve frame 4, and within threaded closures disposed within the frame structure. The valve stem and the valves disposed thereupon is maintained in its normal position with the lower of the valves, seated through the action of gravity aided through the action of a compression spring 11, disposed above the valve stem, the spring 11 being seated within the threaded closure 12. The closure 12 also acts as a head for the cylinder that serves as the measure for the material to be passed therethrough, as well as a locator and bearing for the valve stem. Suitable valve seats are provided within the frame and the threaded closure for seating the valves mounted upon the valve stem. Cream normally flows from the container 5, through suitable port openings through the valve frame into the chamber 13, from where the same flows into the valve cylinders 6 and 7, thus providing a measured amount of cream within the valve cylinder. The net volume of the cylinder may be predetermined by the placing of filler bushing 14, about the valve stem. The valve stem and valve disposed within the chambers are normally held in down or closed position through the action of gravity and the compression spring 11, thus preventing the free flowing of cream from the valve cylinders, but as the valve stems are raised the upper valve is seated thus preventing the inflow of cream, or the free flowing of cream through the valve cylinders, and so long as the same is maintained in the raised position, and the valve 10, is properly seated simultaneously therewith, the valve 9, is unseated and the cream flowing therefrom will empty the valve cylinder.

A coffee measuring receptacle 15, is disposed within the main valve frame and is adapted to being rotated in relation with the valve frame through the action of the operating lever 16. A working connection is maintained between receptacle 15, and the valve frame, through the action of compression spring 17, which said relationship may be increased or decreased in intensity through the action of threaded nut 19. The spring 17, is disposed upon the stem 21. Also disposed upon the stem 21 is a cam actuator disk 22, having cams 23, 24 and 25, disposed thereupon. A locating lever 26, journaled about pin 27, upon the lever 16, is adapted to engagement with the detent 28, disposed upon the valve frame. The object of the detent 28a is to accurately position the cam to raise the valve stems to permit the withdrawal of the predetermined quantity of cream from the cream container. Should it be desired to draw straight cream through my device, the dispensing lever 16, is rotated clockwise and the valve stem 8, will engage with the cam 23, and the valve stem 8a, will engage with the cam 24 and cream will be withdrawn from each of the cylinders 6 and 7. These cams and valve stems are so related that the valve 9, will be unseated from its seat within the valve frame, and the upper valve 10 will not be seated, thus permitting of a free flowing of cream in unmeasured quantity from the cream container until the same has been emptied, and the further rotation of the same would seat the valve 10 with the unseating of the valve 9, so that the contents of each of the cylinders 6 and 7, would be dispensed simultaneously. Should it be desired to dispense black coffee only, through my device, the operating lever 16 is rotated contra-clockwise until the locating lever 26 engages with the detent 28, in which position the port leading from the measuring device 15, will register with the outlet port through the valve frame, and black coffee, untempered with a cream content will flow through port 29, and a full measure of coffee untempered with cream, will be delivered therefrom.

Should it be desired to dispense coffee tempered with a normal cream content, the operating lever 16, will be rotated further contra-clockwise until the detent 30 is engaged, at which time the valve stem 8, will be raised through the contact with the cam 24, and the cream content of one cream dispensing cylinder only, will be served at which time the ported outlet 31, from the coffee measuring container 15, will register with the port leading therefrom, at which time the contents of the coffee measuring device 15, will only be partially emptied a residue below the ported outlet 31, remaining within the dispensing container.

Should it be desired to dispense half coffee and half cream, the valve stem 8a will be raised by contact with the cam surface 25, when the stop lever 26 engages with the detent 32, at which time the coffee content from the measuring device 15, will only partially be emptied, the same flowing to the bottom of the port outlet 33. The port outlet 33, also acts as the inlet port leading from the central passageway 34, disposed within the pipe 2. The port outlets through the measuring device 15, register with the port 35, disposed within the valve frame through which valve port the coffee content flows from the measuring device. To prevent the creation of a vacuum in the coffee measuring receptacle or valve 15, I have provided vent pipes 36. This same vent mechanism is required within the dispensing device for the coffee to prevent a creation of the vacuum therein when the inlet port is closed and the outlet port is open to permit of the free flow from each of the liquid containers.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. A coffee and cream dispenser, consisting of a valve frame, inlet and outlet ports connected to a source of cream and liquid coffee, formed in said frame; valves seated within the frame and controlling the flow of said liquids from the inlet ports to the outlet ports; and a means for opening and closing said, valves, singly and in combination, to permit one, or all of the liquids simultaneously, to flow in measured amounts through said dispenser.

2. A coffee and cream dispenser, consisting of a frame, measuring compartments formed within the frame; inlet and outlet ports leading to and from said compartments; valves disposed within said compartments; and selective means for actuating the valves singly or in combination, to permit the flow of one liquid, or more than one liquid simultaneously.

3. A coffee and cream dispenser, comprising a frame having measuring compartments disposed therein; inlet and outlet ports leading to and from said compartments; valves disposed within the measuring compartments adapted to control of liquids therethrough; means for selectively closing or opening the valves within the measuring compartments to deliver, upon manipulation thereof, predetermined quantities of each liquid, or a combination thereof.

4. The combination in a coffee and cream dispenser, of a frame structure, inlet and outlet ports formed within the frame structure, the inlet ports connecting with a source of cream and coffee; measuring compartments disposed within the frame and having an inlet and outlet port leading thereto and therefrom; valves disposed within the compartments to regulate the flow of liquid into and out of each compartment, or the release of the whole or a part of the liquid content of one of said compartments; and a means to selectively open or close said valves, singly or in combination.

5. A coffee and cream dispenser, comprising a frame, there being a plurality of valve chambers in said frame valves for said chambers, one of said valves being rotatable, inlet and outlet ports for said valve chambers, means connected to said rotatable valve to open and close the same, or to open and close the same and one other of said valves, or to open and close all the valves; and said rotatable valve being adapted to decrease the amount of liquid passing therethrough as the number of additional valves opened thereby is increased.

6. The combination in a coffee and cream dispenser, of a frame, a plurality of valve chambers in said frame, valves disposed in each of said chambers, inlet and outlet ports leading to and from said chambers, air vents for one of said chambers, and manually manipulative means for selectively opening and closing the valves in one, or in more than one of said chambers simultaneously, to deliver a measured amount of liquid therefrom.

7. The combination of a coffee and cream dispenser, of a frame, a plurality of valve chambers formed in said frame, air vents for each of said chambers, valves disposed in each of said chambers, one of said valves being rotatable, varied size ports disposed within the walls of the rotatable valve adapted to register with a port leading to a source of supply of liquid coffee, each of said ports adapted to register with a discharge port formed in the valve chamber, said varied size ports controlling the amount of liquid coffee, flowing through said valve, and means associated with said rotatable valve, adapted when being manipulated, to actuate the valves in the other of said chambers, and to thereby regulate the flow of cream therethrough.

DOLPH M. CLARK.